April 16, 1968  K. BELL ET AL  3,377,964
APPARATUS FOR FORMING AN EDIBLE PRODUCT
Filed Sept. 1, 1965  2 Sheets-Sheet 1
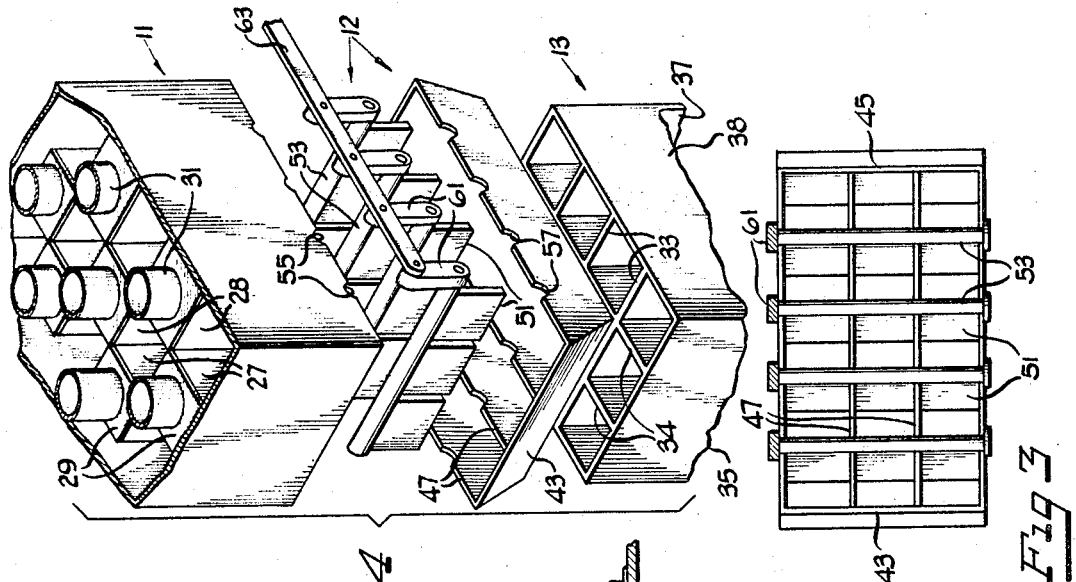
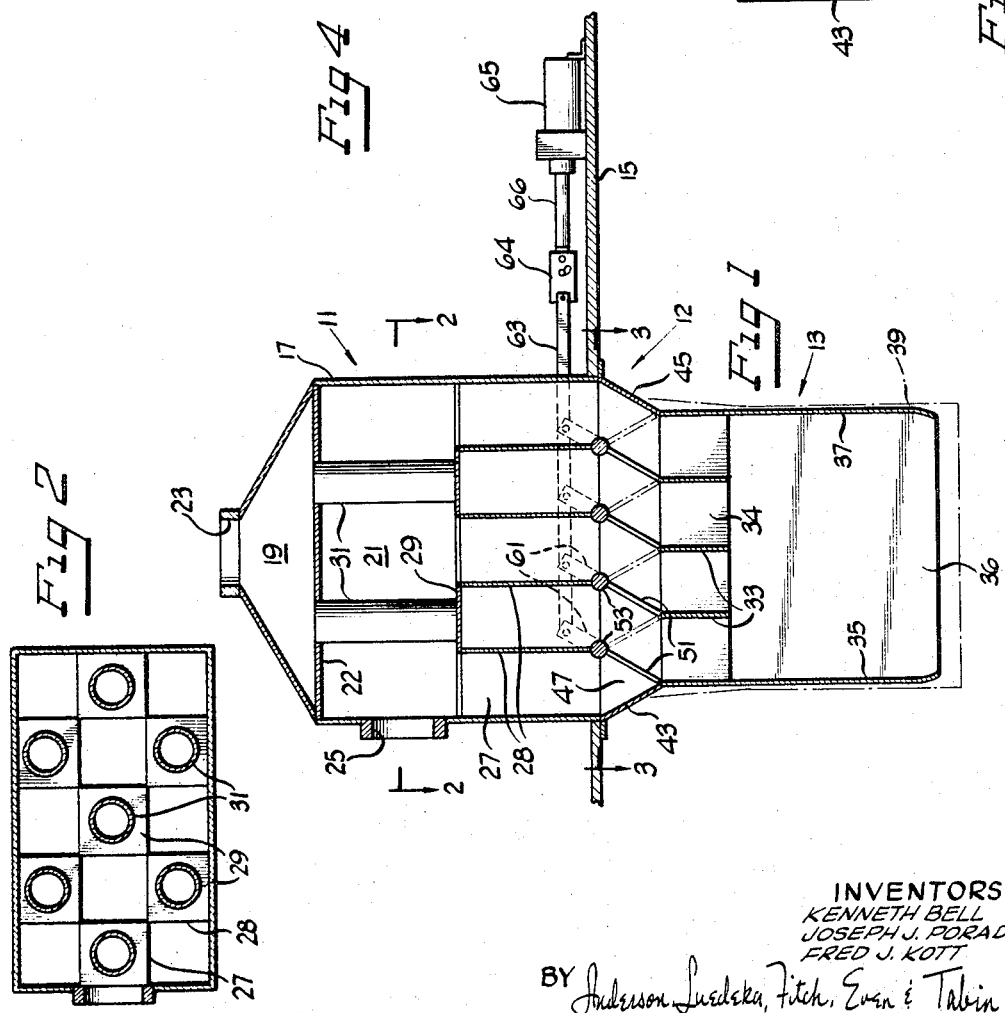
INVENTORS
KENNETH BELL
JOSEPH J. PORADA
FRED J. KOTT
BY Andersen Luedeka, Fitch, Even & Tabin
ATTORNEYS

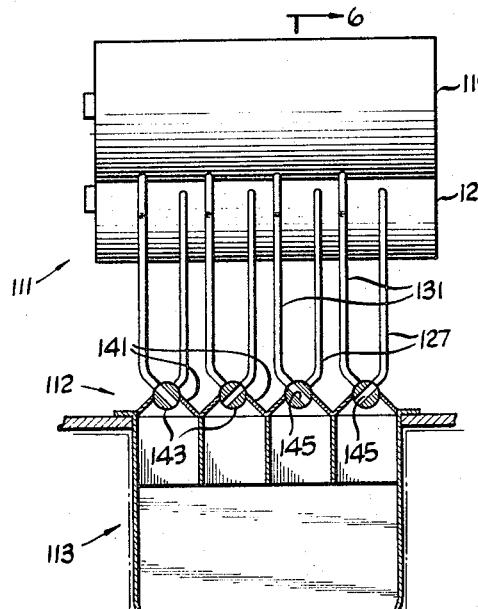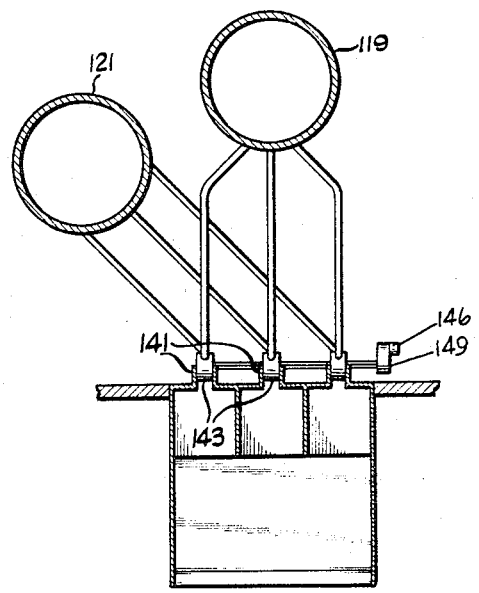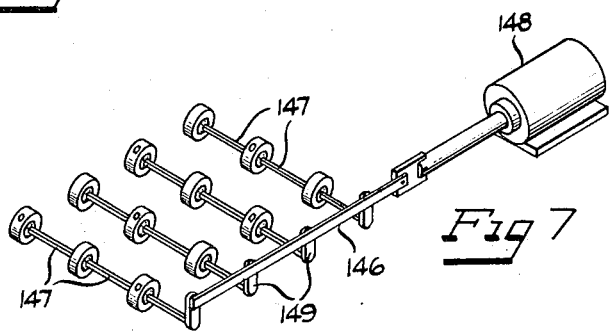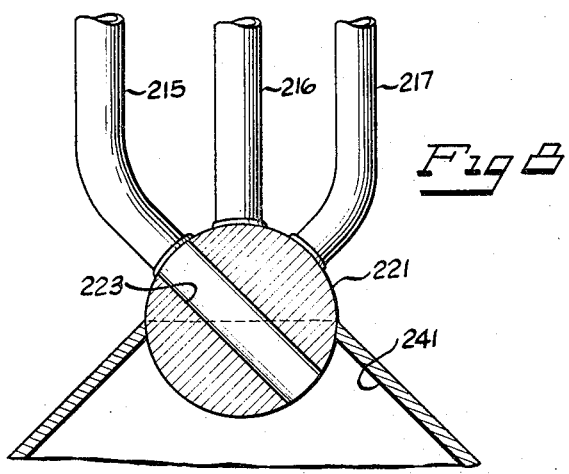

United States Patent Office 3,377,964
Patented Apr. 16, 1968

1

3,377,964
APPARATUS FOR FORMING AN
EDIBLE PRODUCT
Kenneth Bell, Marengo, Joseph J. Porada, Norridge, and Fred J. Kott, Park Ridge, Ill., assignors to National Dairy Products Corporation, New York, N.Y., a corporation of Delaware
Filed Sept. 1, 1965, Ser. No. 484,223
10 Claims. (Cl. 107—1)

ABSTRACT OF THE DISCLOSURE

Apparatus for forming an edible product of different materials with similar sections of the materials arranged in contacting layers and with the sections in each layer arranged in parallel contacting rows, each section in each row in each layer contacting at least one section of a different material in the same row, at least one section of different material in at least one adjacent row, and at least one section of different material in at least one adjacent layer.

---

This invention relates to the forming of an edible product comprised of a plurality of adjacent columns each including a plurality of plastic materials in sequentially arranged sections. More particularly, the invention relates to apparatus for forming an edible product into a rectangular main block comprised of a plurality of substantially smaller adjacent rectangular blocks of the materials arranged sequentially in each of the three directions parallel to the respective edges of the main block.

The invention has particular application to the manufacture of ice cream products having patterns of contrasting colors and/or flavors in three dimensions. In co-pending application Ser. No. 337,991, filed Jan. 13, 1964, now Patent No. 3,295,466, and assigned to the assignee of the present invention, such a product and the apparatus for making the product are shown and described. The product shown and described therein is a main block of ice cream comprised of a plurality of sections of two different flavors arranged such that the block may be sliced with the resulting surfaces at the slice each having a checkerboard pattern. The said application describes a header which extrudes the ice cream through a plurality of orifices arranged in a checkerboard pattern. The header reciprocates with respect to a plurality of forming nozzles feeding the ice cream into a package in order to produce a main block having an alternating pattern of smaller blocks in all three dimensions.

Such apparatus has found considerable success in actual commercial use. Nevertheless, under some circumstances it may be desirable to avoid the necessity for reciprocating the entire header in order to achieve the desired pattern in the final product. For example, cost or size limitations may be such as to preclude the use of apparatus wherein the entire header is reciprocated.

Accordingly, it is an object of this invention to provide apparatus for forming a product of the type described and in which the header may remain fixed with respect to the forming nozzles.

Another object of the invention is to provide an alternative to the ice cream forming machine disclosed in patent application Ser. No. 337,991.

Still another object is to provide apparatus for forming a product of the type described, which is relatively simple in construction and operation.

Other objects of the invention, and the advantages thereof, will become apparent from the following description taken in connection with the accompanying drawings wherein:

FIGURE 1 is a side elevational full section view of apparatus constructed in accordance with the invention;

FIGURE 2 is a sectional view taken along the line 2—2 of FIGURE 1;

FIGURE 3 is a sectional view taken along the line 3—3 of FIGURE 1;

FIGURE 4 is an exploded view, with parts broken away, of the apparatus of FIGURE 1;

FIGURE 5 is a side elevational full section view of an alternative embodiment of the invention;

FIGURE 6 is a sectional view taken along the line 6—6 of FIGURE 5;

FIGURE 7 is a perspective view of some of the valve elements of the apparatus of FIGURE 5; and FIGURE 8 is a full section view of part of a still further embodiment of the invention.

The invention provides apparatus for forming an edible product into a column comprised of a plurality of plastic materials in sequential sections. The apparatus may be so constructed as to form a plurality of such columns adjacent each other to form a main block comprised of a plurality of smaller blocks of the different materials arranged sequentially in predetermined directions with respect to the outer surface of the main block. The apparatus includes a header having a plurality of orifices therein. The header is a structure which serves to store and feed the various materials of the product. Each of the materials is extruded through a respective one of the orifices in the header. A forming nozzle is provided for shaping the materials into a column and a plurality of such nozzles may be grouped together to form the material into a main block of a desired size and shape. A valve is positioned intermediate the header and the forming nozzle for controlling the flow of the materials from the header to the forming nozzle. The valve is operable between a plurality of positions to couple respective ones of the orifices to the forming nozzle for feeding the materials sequentially into the nozzle.

Referring now more particularly to the drawings, the apparatus comprises a header 11, a valve assembly 12, and a filling structure 13. The header 11, valve assembly 12, and filling structure 13 are supported by a platform 15. The apparatus shown is for forming an ice cream product, but it will be understood that products other than ice cream, such as sherbet, ice milk, cheese, etc., could be used in connection with the invention. Furthermore, sequential patterns other than the checkerboard pattern, of three or more colors and/or flavors, could be formed by apparatus constructed in accordance with the teaching of this specification.

Header 11 operates to provide a supply of material at desired places in the apparatus and is comprised of a housing 17 which is divided into a pair of chambers 19 and 21 by a wall 22. A feed orifice 23 is provided in housing 17 for feeding material into chamber 19 under pressure. A similar feed orifice 25 is provided in housing 17 for feeding a dissimilar material into chamber 21 under pressure. In the manufacture of an ice cream product, the dissimilar materials can be of different colors and/or flavors, such as chocolate and vanilla.

The lower portion of housing 17 is divided by a plurality of mutually parallel walls 27 and a further plurality of transverse intersecting mutually parallel walls 28 into a plurality of elongated channels of rectangular cross section. The lower ends of the channels defined by walls 27 and 28 define adjacent coplanar orifices arranged in two sets of mutually parallel rows extending in two perpendicular directions, respectively, in the plane in which they lie.

Alternate ones of the channels defined by walls 27 and 28 in each of the rows in which the channels are arranged are closed by a top wall 29. Those channels which are closed by a top wall 29 are in fluid communication with chamber 19 and are excluded from communication with chamber 21 by means of connecting tubes 31. Those channels which are not closed at their top by top walls 29 open into chamber 21. It will therefore be seen that one type of material, for example vanilla ice cream, may be fed into chamber 19 under pressure through orifice 23 and from chamber 19 through tubes 31 into the channels which are covered by the top walls 29. Similarly, material fed through orifice 25 into chamber 21 which is different from the material fed into chamber 19, for example chocolate ice cream, will flow into the channels in communication with chamber 21.

The filling device 13 contains a plurality of mutually parallel walls 33 and a further plurality of transverse intersecting mutually parallel walls 34. Walls 33 and 34 are toward the top of filling structure 13 and define a plurality of forming nozzles for shaping the materials into adjacent columns. The nozzles defined by walls 33 and 34 are arranged in two sets of mutually parallel rows respectively extending parallel to the two sets of rows of orifices in the header, and are of the same size and shape cross section as such orifices (although such need not necessarily be the case). The nozzles are arranged such that the filling device is substantially rectangular, and the four outer walls 35, 36, 37 and 38 of the filling device extend downwardly into the carton to be filled, designated by the phantom line 39. It should be noted that the nozzles are arranged with one less row in one direction than the number of rows of orifices in the header 11 in the same direction, and are offset by approximately half their width from alignment with such rows.

By the arrangement of the channels in the header 11 and their appropriate communication with the respective chambers 19 and 21, the materials are extruded through the orifices of the channels in a two dimensional checkerboard pattern. In order to obtain this effect in three dimensions, provision must be made for providing alternating sections in the vertical columns comprising the main rectangular block being formed and inserted into the package 39. In order to accomplish this, the previously cited co-pending application moves the entire header assembly in a reciprocating fashion. Under certain conditions, this apparatus may not be susceptible to practical application, and this invention provides an alternative to such apparatus.

In accordance with the invention, valve assembly 12 is positioned intermediate the header assembly 11 and the forming nozzles 13 for controlling the flow of the materials from the header to the forming nozzles. Valve assembly 12 includes a housing comprising a pair of slanted end walls 43 and 45 and a plurality of parallel walls 47. Walls 47 are aligned with appropriate ones of the walls 27 and 33 in the header and filling device, respectively. Walls 47 and end walls 43 define a plurality of tapered chutes, each coupling a row of channels in the manifold portion of the header to a row of nozzles in the filling device. The chutes are tapered, of course, to allow for the fact that there is one less nozzle in each row with which each chute communicates then the number of channels in the corresponding row in the header.

In order to divert the flow of ice cream from alternate channels of the header 11 into each of the nozzles to form alternate sections in the columns formed by the nozzles, a plurality of diverting gates 51 are utilized. Gates 51 are mounted in rows to a plurality of pivot rods 53. Rods 53 are pivotally supported in respective ones of grooves 55 in the lower edge of housing 17 and in corresponding ones of grooves 57 in the upper edge of walls 47. Rods 53 are rotated by a respective one of a plurality of arms 61 simultaneously activated by a link 63. Link 63 is reciprocally actuated through a coupling link 64 by suitable means such as solenoid 65 having a plunger 66.

By observing FIGURE 1, the operation of the apparatus may be more readily perceived. Assume that chamber 21 is filled with chocolate ice cream and chamber 19 is filled with vanilla ice cream, each at a temperature where the ice cream is fluid or plastic but not sufficiently so as to cause diffusion of one flavor into the other. When the gates 51 are in the position shown in the solid lines with their unhinged tips contacting the upper edges of walls 34, the ice cream forced through the nozzles defined by walls 33 and 34 will alternate from left to right, vanilla, chocolate, vanilla, chocolate. When the next layer of ice cream is to be formed, the solenoid 65 is actuated to swing the gates 51 quickly to the position shown in phantom in FIGURE 1 with their unhinged ends contacting the upper edges of adjacent ones of walls 34. In this position the ice cream forced through the nozzles will be from left to right, chocolate, vanilla, chocolate, vanilla. Accordingly, not only is a checkerboard pattern formed in a plane transverse to the flow of ice cream from the header to the filling structure, but each of the columns formed by the respective nozzles is comprised of sections of alternating materials. The resultant product may be sliced in a direction parallel to any of its sides and still yield a checkerboard pattern in the surfaces formed by the slice.

Referring now more particularly to FIGURES 5–7, an alternative embodiment of the invention is shown. In the alternative embodiment shown, a header 111 includes a pair of tanks 119 and 121. Various conducting tubes 131 connect tank 119 to the valve assembly 112, and similar tubes 127 connect the tank 121 to the valve assembly 112. The filling structure 113 is only slightly changed in configuration from the filling structure in FIGURES 1 through 4, but the valve assembly 112 is modified. The valve assembly 112 includes a plurality of feeding channels 141 which are necked down toward their upper ends and which contact a respective one of rotatable cylinders 143. Cylinders 143 each have a diametrical passage 145 bored therein and are all connected for rotation in groups of three by shaft segments 147 (see FIGURE 7). The groups of cylinders 143 are rotated by arms 149 connected to a link 146. The groups of cylinders are simultaneously rotatable by the link 146 and a solenoid 148 to bring respective ends of passages 145 into fluid communication with appropriate ones of the tubes 127 and 131. The opposite end of passage 145 communicates with the channel 141 associated therewith.

Looking to FIGURE 5 for an understanding of the operation of this embodiment of the invention, it will be seen that with the cylinders 143 in the positions shown, passages 145 serve to couple the various ones of tubes 127 and 131 into the various ones of nozzles 141. Thus with tank 119 filled with vanilla ice cream and tank 121 filled with chocolate ice cream, the left hand nozzles will receive vanilla while the second from the left, chocolate, and so on across the width of the filling structure 113. With the cylinders 143 rotated to position wherein the passages 145 are aligned with the respective tubes 127 and 131 opposite in each case to that which is shown, tubes 127 and 131 will be connected to the same nozzles and consequently an alternate material will enter each nozzle. Thus the alternating sections in the columns formed by the nozzles are achieved as was the case in the previous embodiment.

Referring to FIGURE 8, a still further embodiment of the invention is illustrated. The figure shows a device for forming only a single column, but it will be understood that several of such devices can be disposed adjacent each other in the same manner as in FIGURES 5–7 to form a main block comprised of a plurality of abutting columns. This particular embodiment of the invention produces columns wherein sections of more than two different plastic materials are arranged sequentially, and wherein such sections may be arranged sequentially in the transverse layers formed by adjacent sections in adjacent columns. Although by providing a sufficient number of chambers or tanks, the apparatus of FIGURES 1–7 could be used with three or more materials to produce sequential patterns, a perfect three dimension sequential arrangement would not be achieved. The embodiment shown in FIGURE 8 is for making a product wherein three different materials are used. It is to be understood, however, that more than three materials could be used with slight modification in the apparatus to achieve a sequence of materials in each of the three directions parallel to the edges of the main block. Three feeding tanks, not illustrated, are provided for respective conduits or tubes 215, 216 and 217. The ends of conduits 215, 216 and 217 abut the periphery of a rotatable cylindrical valve member 221. A single diametrical passage 223 is provided in valve member 221 to selectively communicate with conduits 215, 216 and 217 and the necked down feeding channel 241. Feeding channel 241 is coupled over a forming nozzle in a filling structure, not shown. The filling structure may be similar to the filling structures used in connection with the previous two embodiments.

In forming the product, the apparatus shown in FIGURE 8 may incorporate a plurality of such valve members 221 positioned as in FIGURES 5–7. The passage 223 is positioned in each of the respective valve members 221 against a respective one of conduits 215, 216 and 217 such that the materials passing through the feeding channel 241 form a layer in filling structure 213 wherein the sections in each row of the layer are arranged sequentially. Each column is formed of sequentially arranged sections by rotating member 221 by suitable means, not shown, to align passage 223 therein with a respective one of conduits 215, 216 and 217 in the sequence desired. The means for rotating member 221 may be as shown in FIGURE 7. Ice cream is forced through the passage 223 from the conduit with which it is aligned due to the pressure of the ice cream maintained in each of the tanks attached to the conduits.

It will therefore be seen that the invention provides apparatus for forming an edible product into a main block comprised of a plurality of substantially smaller adjacent blocks of a substantially lesser plurality of different plastic materials arranged sequentially in predetermined directions with respect to the surface of the main block. The invention has particular application to the manufacture of ice cream products having patterns of contrasting colors and/or flavors in three dimensions. In the apparatus of the invention, the header may remain fixed with respect to the forming nozzles resulting in relatively simple construction and operation.

Other embodiments and modifications of the invention in addition to the three shown and described herein will be apparent to those in the art from the teaching of this specification, and such other embodiments and modifications are intended to fall within the scope of the appendant claims.

What is claimed is:

1. Apparatus for forming an edible product into a column comprised of a plurality of plastic materials in sequentially arranged sections, said apparatus including in combination, a stationary header having a plurality of orifices therein, means for extruding each of the materials from a respective one of said orifices in said header, a stationary forming nozzle for shaping the materials into a column, and valve means positioned intermediate said header and said forming nozzle for controlling the flow of the materials from said header to said forming nozzle, said valve means being operable between a plurality of positions to couple respective ones of said orifices to said forming nozzle for feeding the materials sequentially into said nozzle.

2. Apparatus for forming an edible product into a column comprised of a plurality of plastic materials in sequentially arranged sections, said apparatus including in combination, a stationary header having a plurality of orifices therein, means for extruding each of the materials from a respective one of said orifices in said header, a stationary forming nozzle for shaping the materials into a column, and a valve positioned intermediate said header and said forming nozzle for controlling the flow of the materials from said header to said forming nozzle, said valve comprising a valve element being movable between a plurality of positions to couple respective ones of said orifices to said forming nozzle for feeding the materials sequentially into said nozzle.

3. Apparatus for forming an edible product into a column comprised of two plastic materials in alternating sections, said apparatus including in combination, a stationary header having two orifices therein, means for extruding each of the materials from a different one of said orifices in said header, a stationary forming nozzle for shaping the materials into a column, and a valve positioned intermediate said header and said forming nozzle for controlling the flow of the materials from said header to said forming nozzle, said valve comprising a valve element being movable between two positions to couple alternate ones of said orifices to said forming nozzle for feeding the materials alternately into said nozzle.

4. Apparatus for forming an edible product into a column comprised of two plastic materials in alternating sections, said apparatus including in combination, a header having first and second orifices therein, means for extruding each of the materials from a respective one of said first and second orifices in said header, a forming nozzle for shaping the materials into a column, and a valve positioned intermediate said header and said forming nozzle for controlling the flow of the material from said header to said forming nozzle, said valve comprising a diverting gate pivotal about an axis disposed between said first and second orifices, said gate being pivotal between a first position, wherein said first orifice is coupled to said nozzle and said second orifice is not coupled to said nozzle, and a second position, wherein said second orifice is coupled to said nozzle and said first orifice is not coupled to said nozzle, whereby the materials are fed alternately into said nozzle.

5. Apparatus for forming an edible product into a column comprised of a plurality of plastic materials in sequential sections, said apparatus including in combination, a stationary header having a plurality of orifices therein, means for extruding each of the materials from a respective one of said orifices in said header, a stationary forming nozzle for shaping the materials into a column, and a valve positioned intermediate said header and said forming nozzle for controlling the flow of the material from said header to said forming nozzle, said valve comprising a rotatable member having a passage therein with first and second ends, said member being rotatable to a plurality of positions in each of which said first end of said passage is in communication with a respective one of said orifices, said second end of said passage communicating with said nozzle in all of said positions of said member, whereby the materials may be fed alternately into said nozzle according to the position of said member.

6. Apparatus for forming an edible product into a main block comprised of a plurality of substantially smaller adjacent blocks of a substantially lesser plurality of different plastic materials arranged sequentially in three predetermined directions with respect to the exterior surface of the main block, said apparatus including in combination, a stationary header having a plurality of orifices arranged therein, means for extruding each of the materials from respective ones of said orifices, a plurality of mutually adjacent stationary forming nozzles for shaping the materials into adjacent blocks, and valve means positioned intermediate said header and said nozzles for controlling the flow of the material from said header to said nozzles with the different materials being arranged sequentially in a desired pattern in a plane transverse to the flow of material between said header and said forming nozzles, said valve means being operable to a plurality of positions to couple various ones of said orifices to a respective one of said nozzles for feeding the materials sequentially into each of said nozzles.

7. Apparatus for forming an edible product into a rectangular main block comprised of a plurality of substantially smaller adjacent rectangular blocks of a substantially lesser plurality of different plastic materials arranged sequentially in each of the three directions parallel to the respective edges of the main block, said apparatus including in combination, a stationary header having a plurality of orifices therein arranged in rows extending in each of two mutually perpendicular directions, means for extruding each of the materials from respective ones of said orifices, a plurality of mutually adjacent stationary forming nozzles for shaping the materials into adjacent rectangular blocks, and valve means positioned intermediate with header and said nozzle for controlling the flow of the material from said header to said nozzles such that the different materials are arranged sequentially in each of the two mutually perpendicular directions, said valve means being operable to a plurality of positions to couple various ones of said orifices to a respective one of said nozzles for feeding the materials sequentially into each of said nozzles.

8. Apparatus for forming an edible product into a rectangular main block comprised of a plurality of substantially smaller mutually adjacent rectangular blocks of two different plastic materials arranged alternately in each of the three directions parallel to the respective edges of the main block, said apparatus including in combination, a header including a plurality of adjacent coplanar rectangular orifices therein, means for extruding each of the materials through respective ones of said orifices, a plurality of adjacent forming nozzles each of rectangular cross section of substantially the same size as said orifices, and a valve assembly coupling said header to said plurality of nozzles such that the different materials are arranged alternately in each of two mutually perpendicular directions in the plane of said orifices, said valve assembly comprising a plurality of diverting gates each pivotally mounted at one end thereof between respective ones of said plurality of orifices, said diverting gates being pivotal between first and second positions to alternately couple orifices containing respective ones of said two materials to a given nozzle, whereby the materials are fed alternately into each of said nozzles.

9. Apparatus for forming an edible product into a rectangular main block comprised of a plurality of substantially smaller adjacent rectangular blocks of two different plastic materials arranged alternately in each of the three directions parallel to the respective edges of the main block, said apparatus including a rectangular manifold portion divided into a plurality of adjacent parallel channels therein each of rectangular cross section, said channels being arranged in mutually parallel first rows extending in a given direction and in mutually parallel second rows extending in a direction normal to the given directions, means for feeding each of the materials into respective ones of said channels such that the different materials are arranged alternately in each of said first and second parallel rows of said channels, a rectangular feeding device divided into a plurality of adjacent forming nozzles each of rectangular cross section of substantially the same size as the cross section of said channels, said nozzles being arranged in mutually parallel first rows extending in the given direction and mutually parallel second rows extending in the direction normal to the given directions, said plurality of nozzles being arranged with one less second row than the number of said second rows of said channels and being positioned with said first rows aligned with said first rows of said channels and said second rows offset by approximately one-half their width from said second rows of said channels, and a valve assembly coupling said manifold portion to said plurality of nozzles, said valve assembly comprising a plurality of tapered chutes each coupling a respective one of said first rows of said manifold portion to a respective one of said first rows of said nozzles, said valve assembly further comprising a plurality of diverting gates each pivotally mounted at one end thereof between respective second rows of said plurality of channels at the end of said manifold portion toward said nozzles, said diverting gates being pivotal about axes which extend normal to said given direction, said diverting gates being pivotal between first and second positions to alternately couple channels containing respective ones of said two materials to a given nozzle, whereby the materials are fed alternately into each of said nozzles.

10. Apparatus for forming an edible product into a main block comprised of a plurality of substantially similar adjacent blocks of a substantially lesser plurality of different plastic materials arranged sequentially in three predetermined directions with respect to the exterior surface of the main block, said apparatus including in combination, a header having a plurality of orifices arranged therein, means for extruding each of the materials from respective ones of said orifices, a plurality of mutually adjacent forming nozzles for shaping the materials into adjacent blocks, and valve means positioned intermediate said header and said nozzles for controlling the flow of the material from said header to said nozzles with the different materials being arranged sequentially in a desired pattern in a plane transverse to the flow of material between said header and said forming nozzles, said valve means comprising a plurality of pivotal members each having a passage therein with first and second ends, each of said pivotal members being operable between a plurality of positions in each of which said first end of said passage is in communication with a respective one of said orifices, said second end of said passage being in fluid communication with a single respective one of said nozzles in all of said positions of said pivotal member whereby the materials may be fed sequentially into each of said nozzles.

References Cited

UNITED STATES PATENTS

| | | | |
|---|---|---|---|
| 3,213,808 | 10/1965 | Schafer | 107—1 |
| 3,295,466 | 1/1967 | Bell et al. | 107—1 |
| 3,295,467 | 1/1967 | Gropen | 107—1 |

WALTER A. SCHEEL, *Primary Examiner.*

A. O. HENDERSON, *Assistant Examiner.*